US009167613B2

(12) United States Patent
Kwon et al.

(10) Patent No.: US 9,167,613 B2
(45) Date of Patent: Oct. 20, 2015

(54) METHOD AND APPARATUS FOR SUPPORTING CONNECTIVITY OF PEER-TO-PEER (P2P) COMMUNICATION IN MOBILE COMMUNICATION SYSTEM

(75) Inventors: Il-Won Kwon, Ansan-si (KR); Dai-Kwan Kim, Seoul (KR); Yung-Soo Kim, Seongnam-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 1177 days.

(21) Appl. No.: 12/169,332

(22) Filed: Jul. 8, 2008

(65) Prior Publication Data
US 2009/0016232 A1 Jan. 15, 2009

(30) Foreign Application Priority Data

Jul. 9, 2007 (KR) .......................... 10-2007-0068779

(51) Int. Cl.
*H04L 12/26* (2006.01)
*H04W 76/02* (2009.01)

(52) U.S. Cl.
CPC .................................. *H04W 76/023* (2013.01)

(58) Field of Classification Search
None
See application file for complete search history.

(56) References Cited

U.S. PATENT DOCUMENTS

| 2004/0125776 A1* | 7/2004 | Haugli et al. ................. 370/338 |
| 2004/0147254 A1* | 7/2004 | Reddy et al. ............... 455/422.1 |
| 2004/0162871 A1 | 8/2004 | Pabla et al. |
| 2005/0036470 A1* | 2/2005 | Calvert ........................ 370/338 |
| 2006/0045100 A1* | 3/2006 | Klausberger et al. ......... 370/400 |
| 2006/0160544 A1* | 7/2006 | Sun et al. ................... 455/456.1 |

FOREIGN PATENT DOCUMENTS

| CN | 1527621 A | 9/2004 |
| EP | 1 633 088 A1 | 3/2006 |
| KR | 10-2005-0048719 A | 5/2005 |
| KR | 10-2005-0101491 A | 10/2005 |
| WO | 2004/077920 A2 | 9/2004 |
| WO | 2004/080103 A1 | 9/2004 |
| WO | 2004/088874 A2 | 10/2004 |
| WO | 2005/094108 A1 | 10/2005 |
| WO | 2006/134562 A2 | 12/2006 |

* cited by examiner

*Primary Examiner* — Kouroush Mohebbi
(74) *Attorney, Agent, or Firm* — Jefferson IP Law, LLP

(57) ABSTRACT

A method and an apparatus for supporting connectivity of Peer-to-Peer (P2P) communication in a mobile communication system are provided. An operating method of a Mobile Station (MS) for providing the connectivity of the P2P communications in the mobile communication system includes connecting P2P communications by searching for a correspondent MS in a first Base Station (BS), determining whether a direct P2P communication is feasible with the correspondent MS in the P2P communications and, when the direct P2P communication is not feasible, setting a P2P relay using the first BS.

20 Claims, 7 Drawing Sheets

METHOD AND APPARATUS FOR SUPPORTING CONNECTIVITY OF PEER-TO-PEER (P2P) COMMUNICATION IN MOBILE COMMUNICATION SYSTEM

PRIORITY

This application claims the benefit under 35 U.S.C. §119 (a) of a Korean patent application filed in the Korean Intellectual Property Office on Jul. 9, 2007 and assigned Serial No. 2007-68779, the entire disclosure of which is hereby incorporated by reference.

BACKGROUND OF THE INVENTION

1. Field of the Invention

The present invention relates generally to a Peer-to-Peer (P2P) communication in a mobile communication system. More particularly, the present invention relates to a method and an apparatus for providing connectivity of the P2P communications in the mobile communication system.

2. Description of the Related Art

In a mobile communication system, a calling terminal communicates with a called terminal over a mobile communication network regardless of a distance to the called terminal. That is, regardless of the distance between the calling terminal and the called terminal, the call is always connected to the called terminal via a base station or a mobile switching center of the mobile communication system. When the calling terminal is sufficiently close to the called terminal, it may be more appropriate to directly communicate with the called terminal without the intervening relay of the base station. Herein, the direct communication between the terminals without the intervention of the base station is referred to as a Peer-to-Peer (P2P) communication. Various services are available through the P2P communications and include massive file transfer, Voice over Internet Protocol (VoIP), video conference, and so forth. The P2P communications can provide the same services provided via the base station, with the same quality.

For typical P2P communication, the terminal uses a separate frequency band other than a frequency band allocated to the mobile communication system. That is, a different frequency band than that used for communication through the BS. Accordingly, the terminal includes separate Radio Frequency (RF) transmitters and receivers to process different frequency band signals, such as Infrared Data Association (IrDA) wireless communications or Bluetooth communications. However, when the P2P communications and the mobile communications occupy the same frequency band, the spectral efficiency can be enhanced by addressing interference and flexibly adjusting the transmission bands using an efficient resource employment. For doing so, research is being conducted on a WINNER system in Europe.

However, the conventional P2P communications between user terminals is performed by adaptively regulating a transmit power depending on channel conditions between the terminals. Thus, when the user terminals are distant from each other or when the channel conditions are severely degraded, the limited transmit power of the terminal is not sufficient to handle the communications and it is difficult to provide the connectivity of the P2P communications.

SUMMARY OF THE INVENTION

An aspect of the present invention is to address at least the above mentioned problems and/or disadvantages and to provide at least the advantages described below. Accordingly, an aspect of the present invention is to provide a method and an apparatus for providing connectivity of Peer-to-Peer (P2P) communications in a mobile communication system.

In accordance with an aspect of the present invention, an operating method of a Mobile Station (MS) for providing connectivity of P2P communications in a mobile communication system is provided. The method includes searching for a correspondent MS for P2P communications in a service coverage area of a first Base Station (BS), determining whether a direct P2P communication is feasible with the correspondent MS in the P2P communications and when the direct P2P communication is not feasible, setting a P2P relay using the first BS.

In accordance with another aspect of the present invention, an operating method of a BS for providing connectivity of P2P communications in a mobile communication system is provided. The method includes receiving a P2P connection request from at least one of a first MS and a second MS which make a direct P2P communication in the same cell, sending a P2P response message informing of P2P communication relay to the at least one of the first MS and the second MS in response to the P2P request and, after sending the P2P response message, relaying the P2P communication of the at least one of the first MS and the second MS.

In accordance with yet another aspect of the present invention, an apparatus for an MS for providing connectivity of P2P communications in a mobile communication system is provided. The apparatus includes a P2P connector for searching for a correspondent MS for P2P communications in a service coverage area of a first BS, a P2P monitor for determining whether a direct P2P communication is feasible with the correspondent MS in the P2P communications and a P2P handover manager for, when the direct P2P communication is infeasible, setting a P2P relay using the first BS.

In accordance with still another aspect of the present invention, an apparatus for a BS for providing connectivity of P2P communications in a mobile communication system is provided. The apparatus includes a P2P connector for receiving a P2P connection request from a first MS or a second MS which make a direct P2P communication in the same service coverage area, and sending a P2P connection response message informing of P2P communication relay of the first MS or the second MS in response to the P2P request and a P2P call controller for, after sending the P2P response message, relaying the P2P communication of the first MS or the second MS.

Other aspects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other aspects, features and advantages of certain exemplary embodiments the present invention will become more apparent from the following detailed description taken in conjunction with the accompanying drawings, in which.

Throughout the drawings, it should be noted that like reference numbers are used to depict the same or similar elements, features and structures.

DETAILED DESCRIPTION OF EXEMPLARY EMBODIMENTS

The following description with reference to the accompanying drawings is provided to assist in a comprehensive understanding of exemplary embodiments of the present invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. Also, descriptions of well-known functions and constructions are omitted for clarity and conciseness.

Exemplary embodiments of the present invention provide a method and an apparatus for supporting connectivity of Peer-to-Peer (P2P) communications in a mobile communication system.

Figure 1:
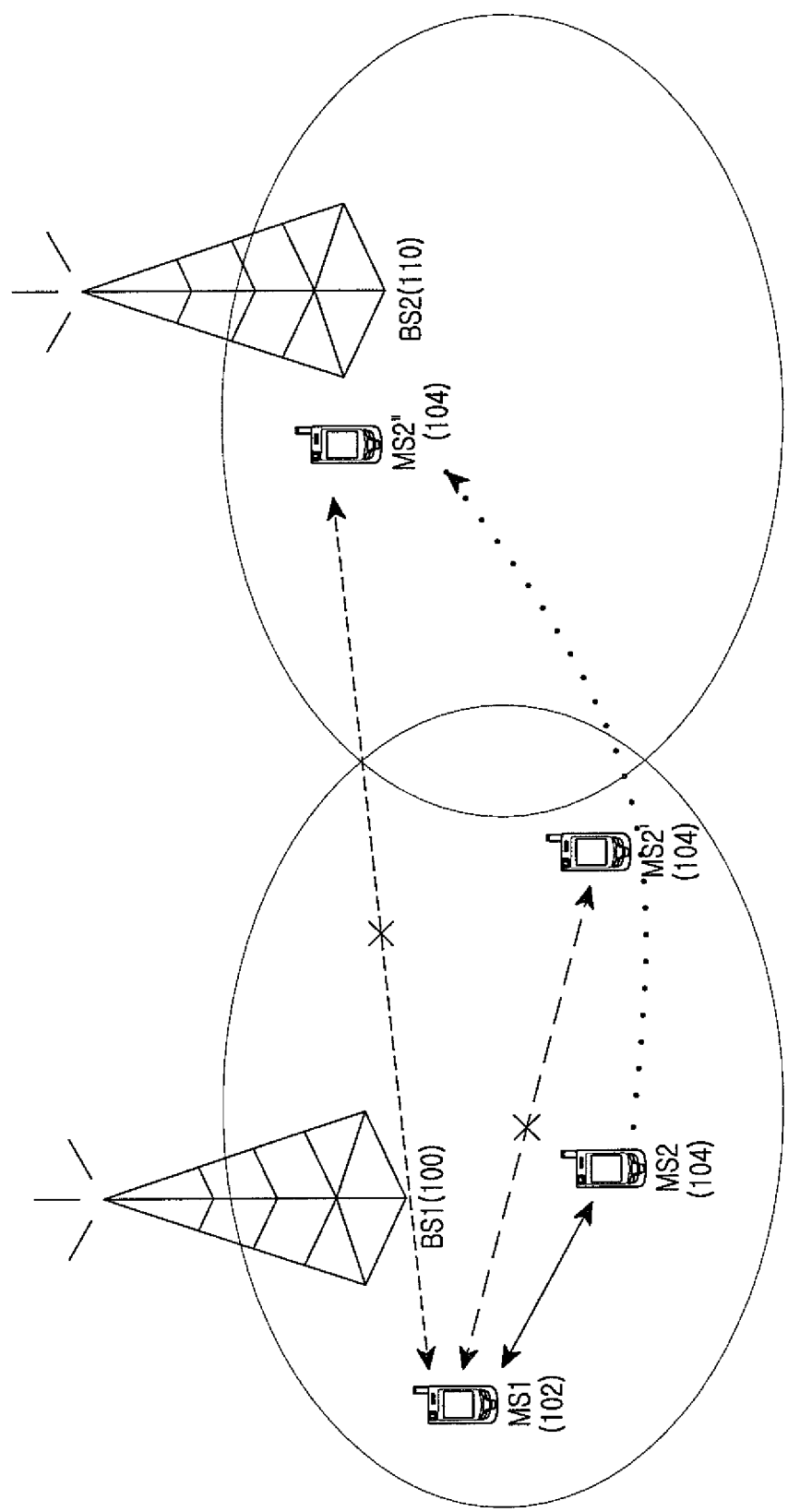
FIG. 1 is a diagram of P2P communications between Mobile Stations (MSs) in a mobile communication system according to an exemplary embodiment of the present invention.

FIG. 1 is a diagram of P2P communications between Mobile Stations (MSs) in a mobile communication system according to an exemplary embodiment of the present invention.

The mobile communication system includes Base Stations (BSs) 100 and 110, and MSs 102 and 104. Although two BSs and two MSs are illustrated in FIG. 1, this is merely an example and the number of the BSs and the number of the MSs can be greater or smaller than illustrated. The mobile communication system may further include a mobile switching center (not shown) which switches on and off between the mobile switching centers or the BSs, which shall be omitted for clarity.

The MSs 102 and 104 perform communications by accessing the corresponding BS through an access procedure in a service coverage area or cell of the BS. Without using a separate P2P transmitter and receiver, an MS can conduct direct P2P communications with a nearby MS by sharing the existing resources.

Each of the BSs 100 and 110 provide a data transfer service to the MSs within their respective service coverage area. When there is a difficulty in the P2P communications between the MSs, the BSs 100 and 110 may sustain the P2P connectivity by relaying the P2P service between the MSs.

Either of the MSs 102 and 104 may determine whether the P2P relay service is necessary and report the need to the appropriate BS 100 or 110. Alternatively, the appropriate BS 100 or 110 may determine whether the P2P relay service is needed by monitoring the P2P terminals by itself.

Herein, it is assumed that the MS1 102 and the MS2 104 are P2P-connected through a P2P connection procedure, and that the MS2 104 moves to the positions of MS2' 104 and then to the MS2" 104. If the MS2 104 moves from the position MS2' 104 to the position MS2" 104, the distance between the MS1 102 and the MS2 104 increases. In this situation, the MS2 104 cannot sustain the existing P2P service with the MS1 102 because of its limited transmission power. Accordingly, a BS P2P relay service is necessary. However, it is first necessary to determine the necessity of the BS associated P2P communication. How to determine the necessity of the BS associated P2P communication to sustain the P2P service through a handover is explained under two conditions. The first is when the MS makes the determination and the second is when the BS makes the determination.

When the MS2 104 travels within the service coverage area of the BS1 100 and the P2P service is interrupted, the MS determines whether the BS associated P2P service is available and provides the P2P connectivity, which is now described.

In this situation, the MS2' 104 cannot perform P2P communication with the MS1 102, and the MS1 102 and the MS2 104 can each communicate with the BS1 100 as they are in the same service coverage area of the BS1 100. At the location of the MS2' 104, the MSs 102 and 104 determine whether the P2P service can be sustained. When the P2P communication is infeasible, the MSs 102 and 104 report to the BS1 100 that the P2P service cannot be sustained. When the BS1 100 permits the P2P relay access, the MSs 102 and 104 can sustain the connectivity of the P2P service between them using the P2P service via the BS1 100. In that situation, a P2P service path between the MS1 102 and the MS2 104 is a path 1-2 or a path 2-1 in FIG. 2.

Now, descriptions are provided of a case where the BS provides the P2P connectivity by determining whether the P2P service is feasible when the P2P service is interrupted because the MS2 104 travels within the cell coverage of the BS1 100.

Figure 2:
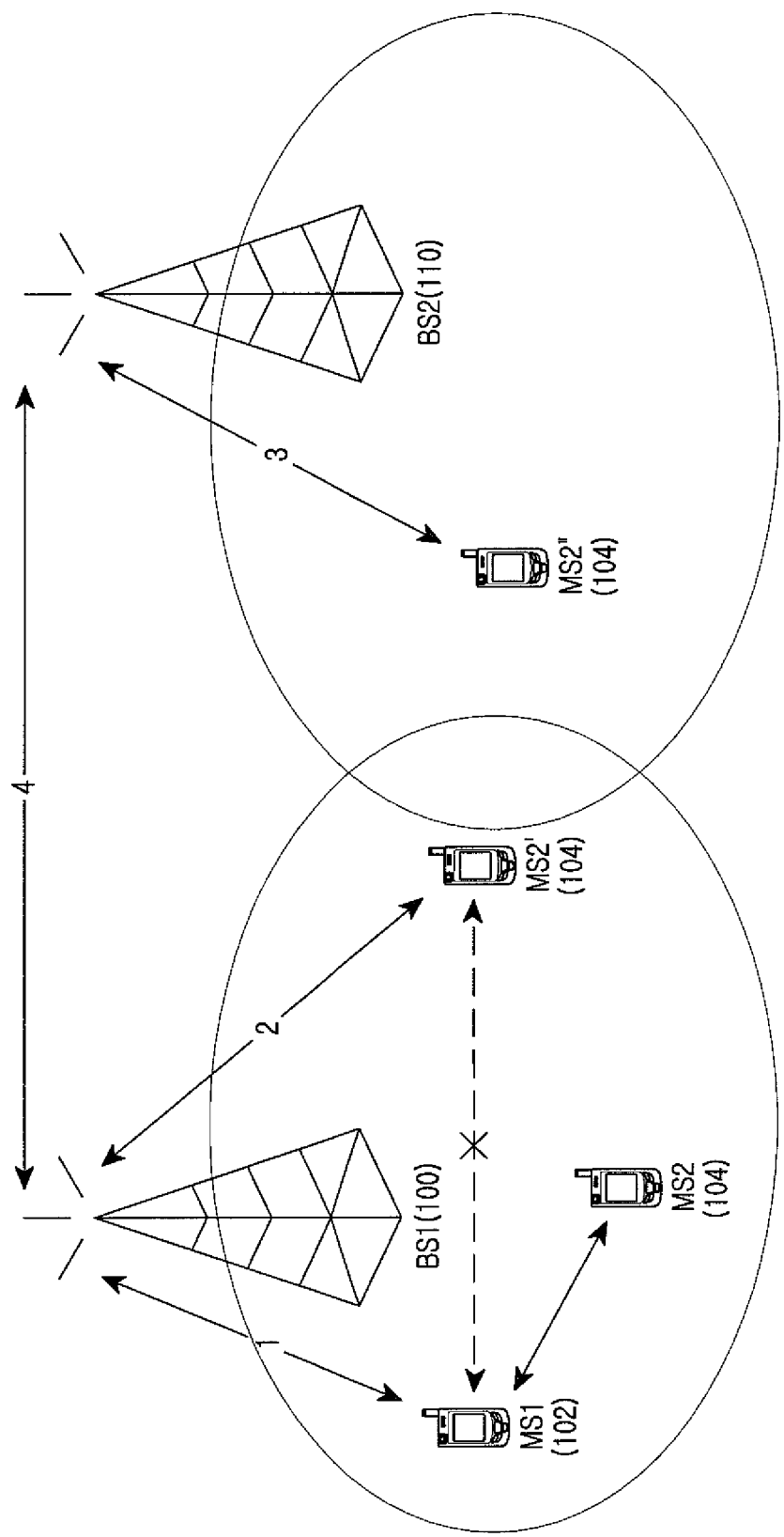
FIG. 2 is a diagram of a P2P communication connection between MSs in a mobile communication system according to an exemplary embodiment of the present invention.

When the P2P communication state of the MS1 102 is reported to the BS1 100 while the MS2 104 is at the location of MS2' 104, the BS1 100 determines whether the P2P service can be sustained. When the P2P communication is infeasible, the MSs 102 and 104, both of which reside in the service coverage area of the BS1 100, can still sustain the connectivity of the P2P service between them by using the P2P service via the BS1 100 upon the P2P relay access permission from the BS1 100. In doing so, the P2P service path between the MS1 102 and the MS2 104 is 1-2 or 2-1 as illustrated in FIG. 2.

In another situation, the MS2 104 may move from the position MS2' 104 back to the position MS2 104 while in the process of P2P communication via the BS1 100. During this movement, the MS2 104 may monitor the channel conditions of the P2P communications. If the MS2 104 determines that it is possible to communicate directly with the MS1 102 without relaying through the BS1 100 as determined by the results of the monitoring, the MS2 104 reports this to the BS1 100. Then, the MSs 102 and 104 change from a 'BS relay P2P communication mode' to a 'direct P2P communication mode' through the direct P2P access permission between the MSs. Thus, the service connectivity can be provided with direct P2P communication the channel conditions are suitable.

As another example of the 'direct P2P communication mode', when the MS2' 104 moves to the position of MS2 104 during the P2P communications via the BS1 100, the MS2 104 reports the radio channel conditions of the P2P communication to the BS1 100. The BS1 100 determines whether to sustain the P2P communications and transitions from a 'BS associated P2P communication mode' to the 'direct P2P communication mode'. Thus, the service connectivity can be provided with direct P2P communication using the acceptable channel conditions.

When the MS2' 104 moves to the position of MS2" 104, that is, when the MS2 104 moves into the service coverage area of the BS2 110, the P2P service via one BS is suspended. In this situation, the MS (the MS1 102 or the MS2 104) provides the P2P connectivity by determining the P2P serviceability, which is now illustrated.

Because the MS2" 104 has moved into the service coverage area of the BS2 110, the MS2" 104 cannot perform P2P communication with the MS1 102 in the same manner any more. The MS1 102, within the service coverage area of the BS1 100, maintains access to the BS1 100, whereas the MS2" 104 is outside the service coverage area of the BS1 100. The MS2" 104 scans the neighbor cell BS2 110 and hands over to the neighbor BS2 110. As a result, the MS1 102 is in P2P communication with the BS1 100 and the MS2" 104 is in P2P communication with the BS2 110. Over the backbone network of the BS1 100 and the BS2 110, the MS1 102 and the MS2" 104 can support the continuity/connectivity of the P2P data communication. The P2P service path between the MS1 102 and the MS2 104 is 1-4-3 or 3-4-1 in FIG. 2.

When the MS2' moves to the position of MS2", the BS evaluates if the P2P service is feasible and determines that the MS2" cannot support P2P communication with the MS1 any longer. Hence, when this is reported to the BS1 100, the BS1 100 acquires the P2P communication state of the MSs. The MS1 102 maintains access to the BS1 100 within the service coverage area of the BS1 100, whereas the MS2" 104 is outside the cell coverage of the BS1 100. The BS1 100 forwards information relating to a candidate BS to the MS2" 104, and the MS2" 104 hands over to the neighbor BS, in this case BS2 110. As a result, the MS1 102 performs the BS associated communication with the BS1 100, and the MS2" 104 performs the BS associated communication with the BS2 110. Over the backbone network between the BS1 100 and the BS2 110, the MS1 102 and the MS2" 104 can support the connectivity of the P2P data communications. In doing so, the P2P path is 1-3-4 or 4-3-1 in FIG. 2.

Conversely, the MS2 104 may move from the position MS2" to the position MS2' during the condition in which the MS2" performs P2P communication with the MS1 102 via the BS1 100 and the BS2 110. When the MS2 104 travels to the position MS2' from the position MS2", the MS2 104 is now outside the service coverage area of the BS2 110. Accordingly, the MS2" 104 scans the neighbor cell BS (the BS1 100) and then hands over to the BS1 100, thus supporting the connectivity of the P2P communications.

More specifically, in the movement from the position MS2" to the position MS2' while the MS2" performs P2P communication with the MS1 102 via the BS1 100 and the BS2 110 and then travels to the MS2', the MS2" is outside the service coverage area of the BS2 110. The MS2" reports this to its accessed BS (the BS2 110). The BS2 110 acquires the current state of the MS and forwards information relating to a candidate BS to the MS2". Using the forwarded information, the MS2" 104 hands over to the BS1 100, to thus support the connectivity of the P2P communication.

Figure 3:
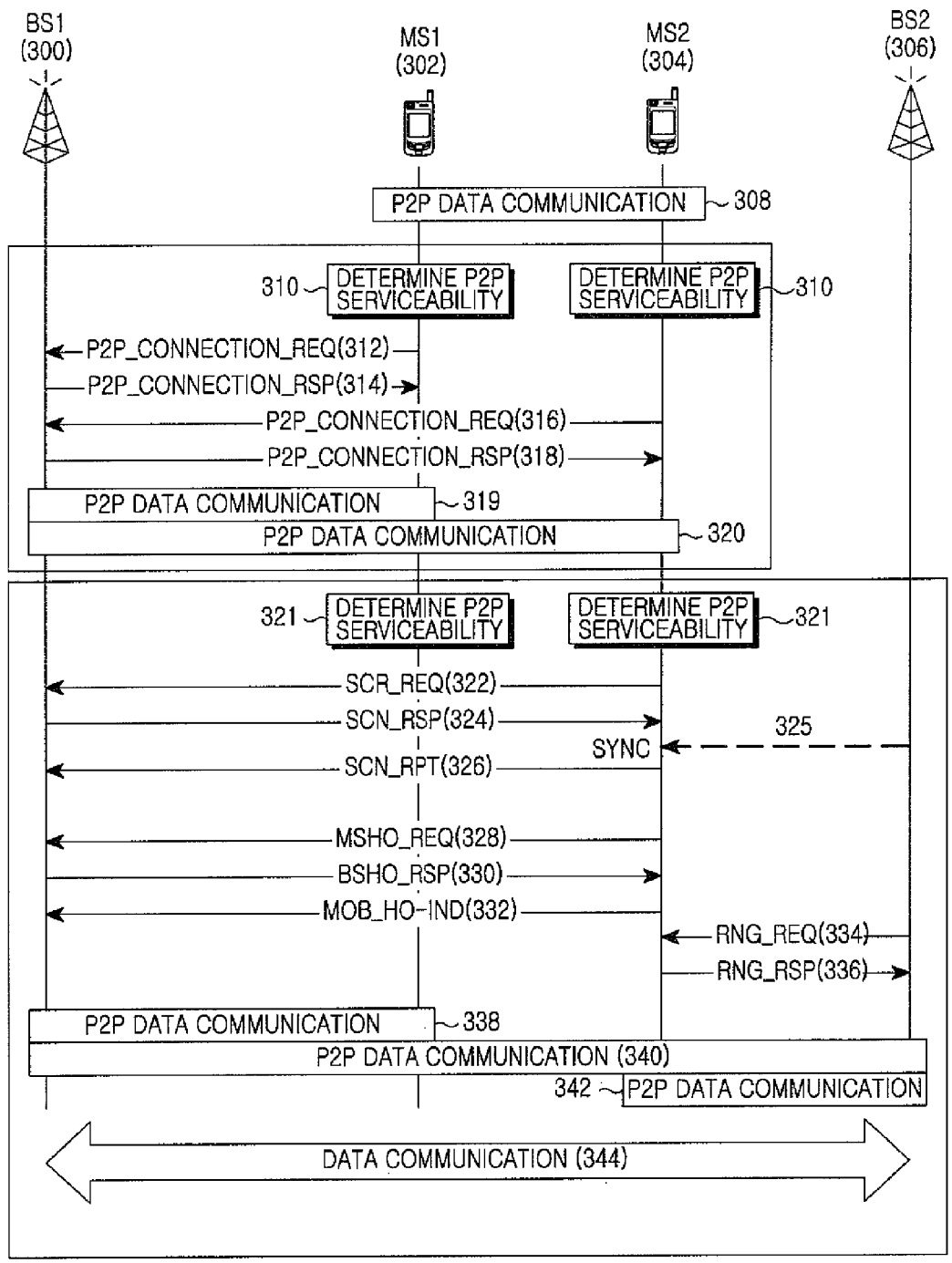
FIG. 3 is a signal flow diagram for supporting connectivity of P2P communication between MSs in a mobile communication system according to an exemplary embodiment of the present invention.

FIG. 3 is a signal flow diagram for supporting connectivity of P2P communications between MSs in a mobile communication system according to an exemplary embodiment of the present invention.

MS1 302 and MS2 304 of FIG. 3 perform P2P data communication through the P2P connection procedure in step 308. The P2P connection procedure is outside the scope of the exemplary embodiments of the invention and shall be omitted for brevity.

If the distance between the MSs 302 and 304 becomes too great or when the radio channel conditions severely deteriorate, the MS1 302 and the MS2 304 cannot sustain the P2P service with their limited transmission power. Hence, each of the MSs 302 and 304 monitors and determines whether the P2P service is feasible or not in step 310. In an exemplary implementation, the MSs monitor and determine service feasibility using a signal strength of the correspondent MS as evaluated by time periods or on a schedule.

When determining that it is difficult to maintain the P2P service (e.g., when the signal level falls below a threshold), the MS1 302 request a P2P service relay to the BS1 300 by sending a P2P_Connection_REQ message in step 312. Upon receiving the P2P_Connection_REQ message, the BS1 300 sends a P2P_Connection_RSP message informing of the P2P connection request, to the MS1 302 in step 314. Likewise, when determining that it is difficult to sustain the P2P service, the MS2 304 requests the P2P service relay by sending a P2P_Connection_REQ to the BS1 300 in step 316. The BS1 300, receiving the P2P_Connection_REQ message, sends a P2P_Connection_RSP message informing of the P2P connection request to the MS2 304 in step 318. In doing so, it is assumed that the MS1 302 and the MS2 304 are traveling within the same cell.

The format of the P2P_Connection_REQ message is shown as below:

```
P2P_connection_REQ_Format( ){
Management message type = A
P2Pnet_ID
P2P_MS_ID
P2P_resource_information
P2P_service_type
}
```

The P2P_Connection_REQ message includes information relating to a management message type, a P2P network IDentifier (ID), a P2P MS ID, P2P resource information, and P2P service type.

The format of the P2P_Connection_RSP message is shown as below:

```
P2P_connection_RSP_Format( ){
Management message type =B
P2P_connection_approved
Anchor BS ID
P2P_service_type
}
```

The P2P_Connection_RSP message includes information relating to a management message type, a P2P connection approval or disapproval, an anchor BS ID, and a P2P service type.

Next, the BS1 300 approves the P2P connection of the MS1 302 and the MS2 304 by determining the state of resources for the P2P service. When the BS1 300 approves the P2P connection of the MS1 302 or the MS2 304, the MS1 302 conducts the P2P data communication via the BS1 300 in step 319 (that is, the MS1 302 sustains the P2P session with the BS1 300). Likewise, the MS2 304 also conducts the P2P data communication with the MS1 302 via the BS1 300 in step 320 (that is, the MS2 304 sustains the P2P session with the BS1 300).

The MS1 302 and the MS2 304 determine whether P2P service is feasible in step 321. Upon determining that it is difficult to sustain the P2P service because of the movement into the service coverage area of another BS2 306, the MS2 304 sends a SCaNning interval allocation REQuest (SCN_REQ) message to the BS1 300 in step 322. The BS1 300, receiving the SCN_REQ message, sends a SCN_RSP message to the MS2 304 in step 324. After receiving the SCN_RSP message, the MS2 304 discovers a handover target BS (it is assumed that the BS2 306 is the handover target BS) through the scanning and acquires BS information and synchronization information by receiving a broadcast message of the BS2 306 in step 325.

Next, the MS2 304 synchronizes with the BS2 306 and sends a SCN_RePorT (SCN_RPT) message to the BS1 300 to report the scanning result in step 326.

After sending an MS HandOver REQ (MSHO_REQ) message to the BS1 300 to initiate the handover to the BS2 306 in step 328, the MS2 304 receives a BSHO_RSP message from the BS1 300 in step 330. Upon receiving the BSHO_RSP message, the MS2 304 sends MOB_HO_INDication (MOB_HO_IND) message informing of the handover cancellation or rejection in step 332.

After sending a RaNGing_REQ (RNG_REQ) message to the BS2 306 in step 334, the MS2 304 receives a RNG_RSP message from the BS2 306 in step 336.

As such, the MS1 302 sustains the P2P service through the relay of the BS1 300 in step 338 and the MS2 304 sustains the P2P service through the relay of the BS2 306 in step 342. The BS1 300 and the BS2 306 are connected to each other via the switching center or the backbone network in step 340 and provide the connectivity of the P2P service between the MS1 302 and the MS2 304 in step 344.

Figure 4:
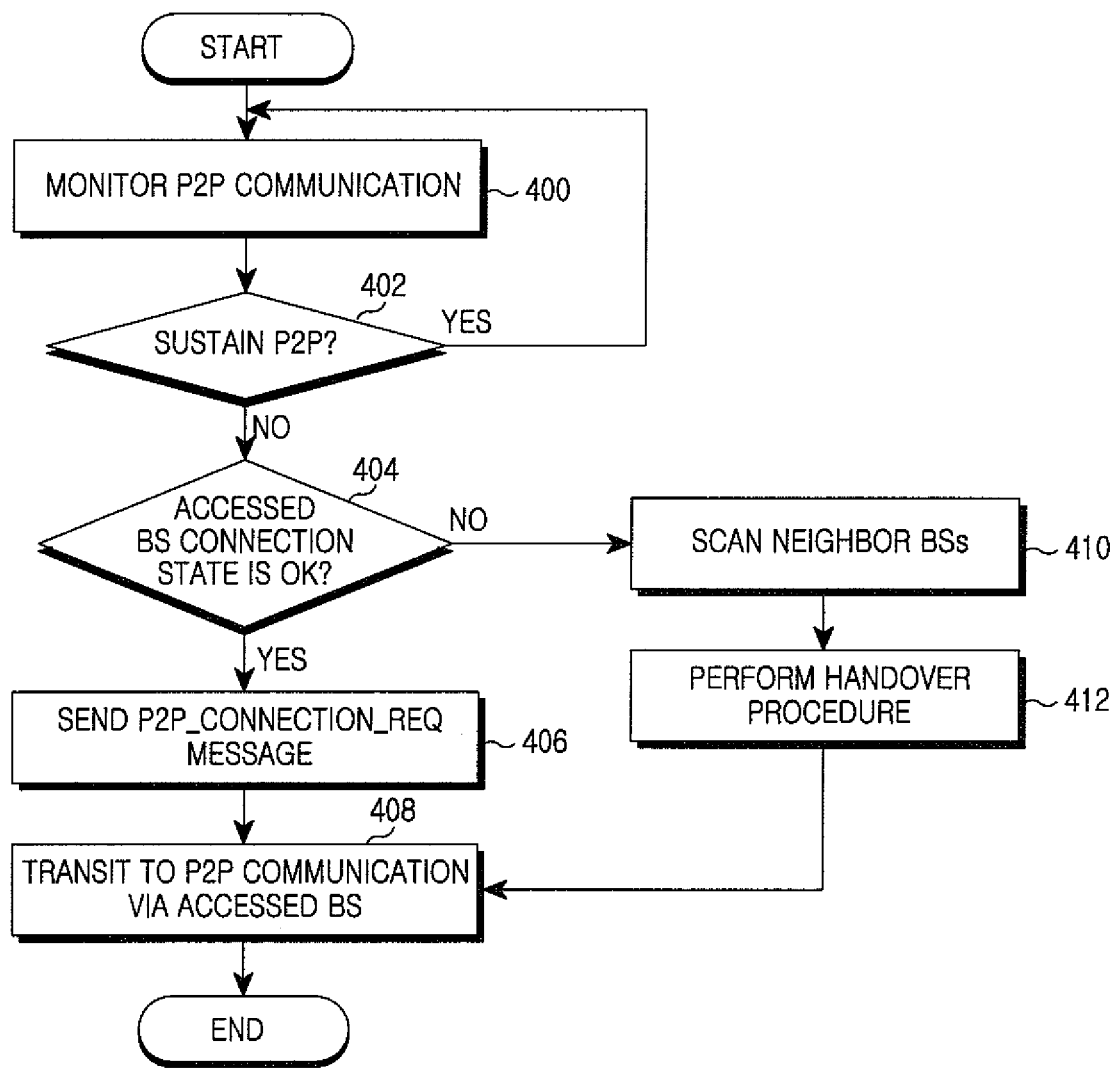
FIG. 4 is a flowchart of operations of an MS for supporting connectivity of P2P communication between MSs in a mobile communication system according to an exemplary embodiment of the present invention.

FIG. 4 is a flowchart of operations of an MS for supporting connectivity of P2P communications between MSs in a mobile communication system according to an exemplary embodiment of the present invention.

In step 400, the MS monitors the P2P communication with the corresponding MS. In an exemplary implementation, the MS may monitor the P2P communication by monitoring the signal strength of the correspondent MS. Alternatively, the P2P communication may be monitored using a delay time of the response signal.

In step 402, the MS determines whether the P2P service can be sustained based on the result of the monitoring. When the P2P service is sustainable, the MS returns to step 400 and continues to monitor the P2P communication.

In contrast, when the P2P communication cannot be sustained, the MS determines the connection state of the accessed BS in step 404. When it is determined that the accessed BS is connectable in step 404, the MS requests the P2P service relay by sending the P2P_Connection_REQ message to the corresponding BS in step 406. In doing so, the two MSs in the P2P communications travel within the same service cell.

In step 408, the MS sustains the P2P service by transiting to the P2P communications via the accessed BS.

When it is determined that the accessed BS is not connectable in step 404, the MS scans to discover a handover target BS in step 410.

In step 412, the MS performs a handover procedure to hand over to the corresponding BS. Herein, the handover procedure is executed according to a predefined handover procedure.

Next, the MS finishes the connectivity process of the P2P communications.

Figure 5:
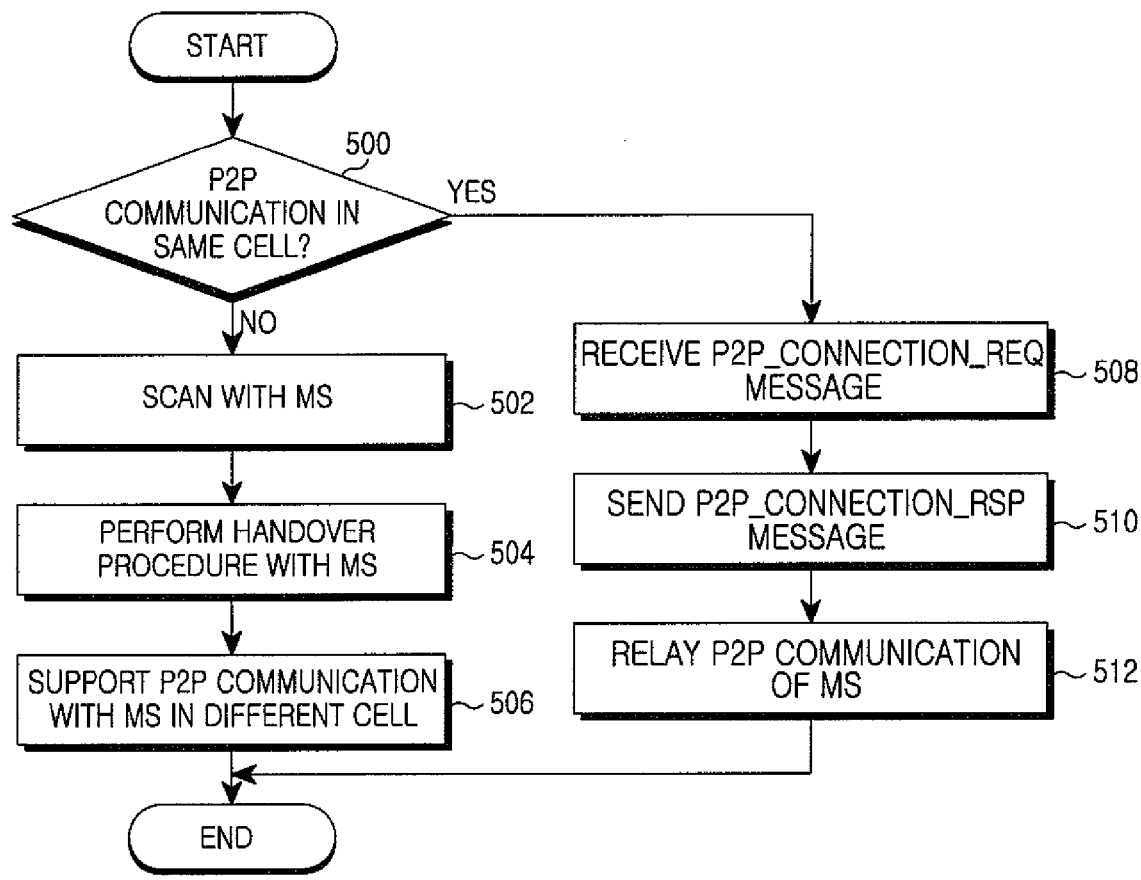
FIG. 5 is a flowchart of operations of a Base Station (BS) for supporting connectivity of P2P communication between MSs in a mobile communication system according to an exemplary embodiment of the present invention.

FIG. 5 is a flowchart of operations of a BS for supporting connectivity of P2P communications between MSs in a mobile communication system according to an exemplary embodiment of the present invention.

When MSs that are in P2P communication request the P2P relay within the service cell, the BS determines whether the two MSs of the P2P communication are in the same service coverage area in step 500. When it is determined that the two MSs are in the same service coverage area, the BS receives P2P_Connection_REQ messages from the two MSs in step 508.

In step 510, the BS permits the P2P connection relay by sending the P2P_Connection_RSP message to the two MSs in response to the P2P_Connection_REQ messages.

In step 512, the BS relays the P2P service of the MSs.

By contrast, when it is determined that the two MSs are not in the same service coverage area in step 500, that is, when one of the two MSs moves to a different service coverage area, the BS scans with the corresponding MS (the MS that has moved to the different service cell) and receives information of neighbor BSs of the corresponding MS in step 502.

Accordingly, when the P2P communication is not sustained in the current cell, the BS scans with the MS in step 502.

In step 504, the BS performs a handover procedure with the corresponding MS. At this time, the BS stores information of the BS to which the corresponding MS is moved (hereafter, referred to as a target BS) and thus holds the interface with the target BS.

In step 506, the BS provides the P2P connectivity by supporting the P2P service to the MS in the different cell.

Next, the BS finishes this connectivity process of the P2P communication.

Figure 6:
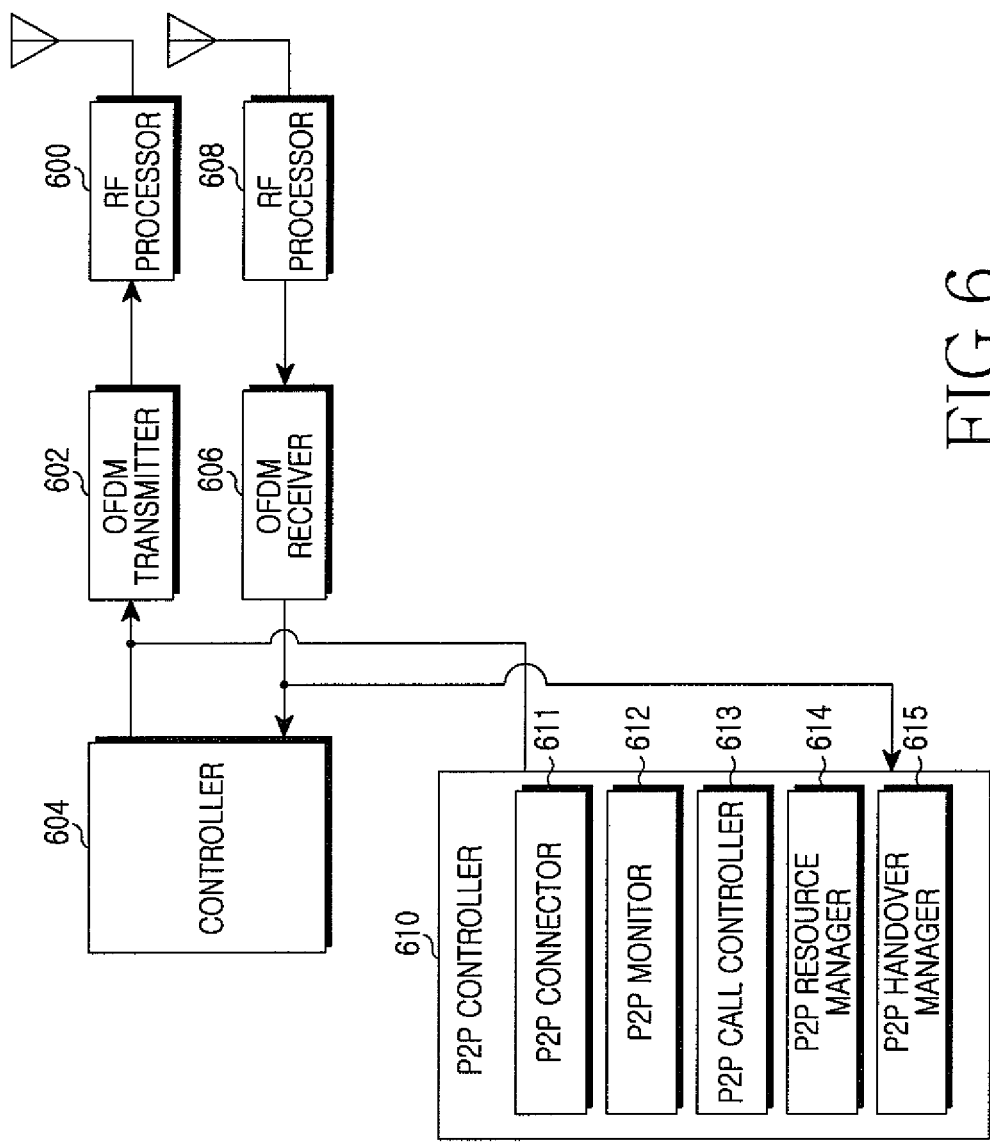
FIG. 6 is a block diagram of a BS for supporting connectivity of P2P communication between MSs in a mobile communication system according to an exemplary embodiment of the present invention.

FIG. 6 is a block diagram of a BS for supporting connectivity of P2P communications between MSs in a mobile communication system according to an exemplary embodiment of the present invention.

The BS of FIG. 6 includes a Radio Frequency (RF) processor 600 for transmitting, an Orthogonal Frequency Division Multiplexing (OFDM) transmitter 602, a controller 604, an OFDM receiver 606, an RF processor 608 for receiving, and a P2P controller 610. The P2P controller 610 includes a P2P connector 611, a P2P monitor 612, a P2P call controller 613, a P2P resource manager 614, and a P2P handover manager 615. The P2P controller 610 controls the P2P relay communications between the MSs.

The RF processor 608 for receiving converts an RF signal received by an antenna to a baseband analog signal. The OFDM receiver 606 converts the analog signal output from the RF processor 608 to sample data. Next, the OFDM receiver 606 converts the sample data to frequency-domain data using a Fast Fourier Transform (FFT) and selects data of subcarriers to be actually received from the frequency-domain data. Alternatively, the OFDM receiver 606 demodulates and decodes the data at a preset modulation level (Modulation and Coding Scheme (MCS) level) and outputs the data to the controller 604 and/or the P2P controller 610.

The controller 604 receives necessary information from the relevant component of the physical layer in the process of the typical mobile communication protocol processing via the switching center or the BS, or issues a control signal to the relevant component of the physical layer. The controller 604 can control the transmitter and the receiver in a Time Division Duplex (TDD) mode or a Frequency Division Duplex (FDD) mode.

In contrast, the P2P controller 610 receives necessary information from the relevant component of the physical layer during the P2P communication protocol processing between the MSs, or issues a control signal to the relevant component of the physical layer. The P2P controller 610 can also adopt the TDD or FDD scheme.

More specifically, the P2P connector 611 locates the corresponding MS in the P2P communication mode and makes the P2P connection to the corresponding MS according to a preset procedure. When the correspondent MS of the P2P communication moves too great a distance or a poor channel state complicates the direct P2P communications, the P2P connector 611 generates the P2P_Connection_RSP message in response to the P2P_Connection_REQ message, sends the generated P2P_Connection_RSP message to the corresponding MS, and thus accesses to relay the P2P communication of the MS.

The P2P monitor 612 determines whether the P2P service can be sustained in the P2P communication by monitoring the corresponding MS by certain time periods or on a schedule. Alternatively, the P2P monitor 612 can be report of the P2P communicability from the MS.

The P2P call controller 613 controls the incoming P2P call processing or the outgoing P2P call processing. When the direct P2P communication between the MSs is difficult to sustain after the P2P monitor 612 determines the P2P communicability, the P2P call controller 613 controls to relay the P2P communication via the BS. For example, when MSs in the same service coverage area cannot sustain the direct P2P communication, the P2P call controller 613 maintains the P2P relay through the P2P connector 611. When the P2P communication is not serviced between different service coverage areas, the P2P call controller 613 controls to relay the P2P communication through the P2P handover manager 615.

When the MSs of the P2P communication move to a different service coverage area, the P2P handover manger 615 controls the handover for the sake of the connectivity of the P2P communication under the control of the P2P call controller 613.

The P2P resource manager 614 manages resources for the P2P communications and allocates the resources for the P2P communications if necessary. For example, the P2P resource manager 614 allocates the required resources when the P2P connector 611 connects to the corresponding MS, when the P2P monitor 612 monitors the MS-MS P2P communication, when the P2P call controller 613 processes the call, and when the P2P handover manager 615 performs the handover procedure. Alternatively, the resources for the P2P communications can be allocated fixedly or dynamically.

The OFDM transmitter 602 codes and modulates the data output from the controller 604 or the P2P controller 610 at the preset modulation level (MCS level). The OFDM transmitter 602 converts the modulated data to sample data (OFDM symbols) through Inverse FFT (IFFT). Next, the OFDM transmitter 602 converts the sample data to an analog signal and outputs the analog signal to the RF processor 600 for transmission. The RF processor 600 converts the analog signal to an RF signal and then transmits the RF signal over the antenna.

Figure 7:
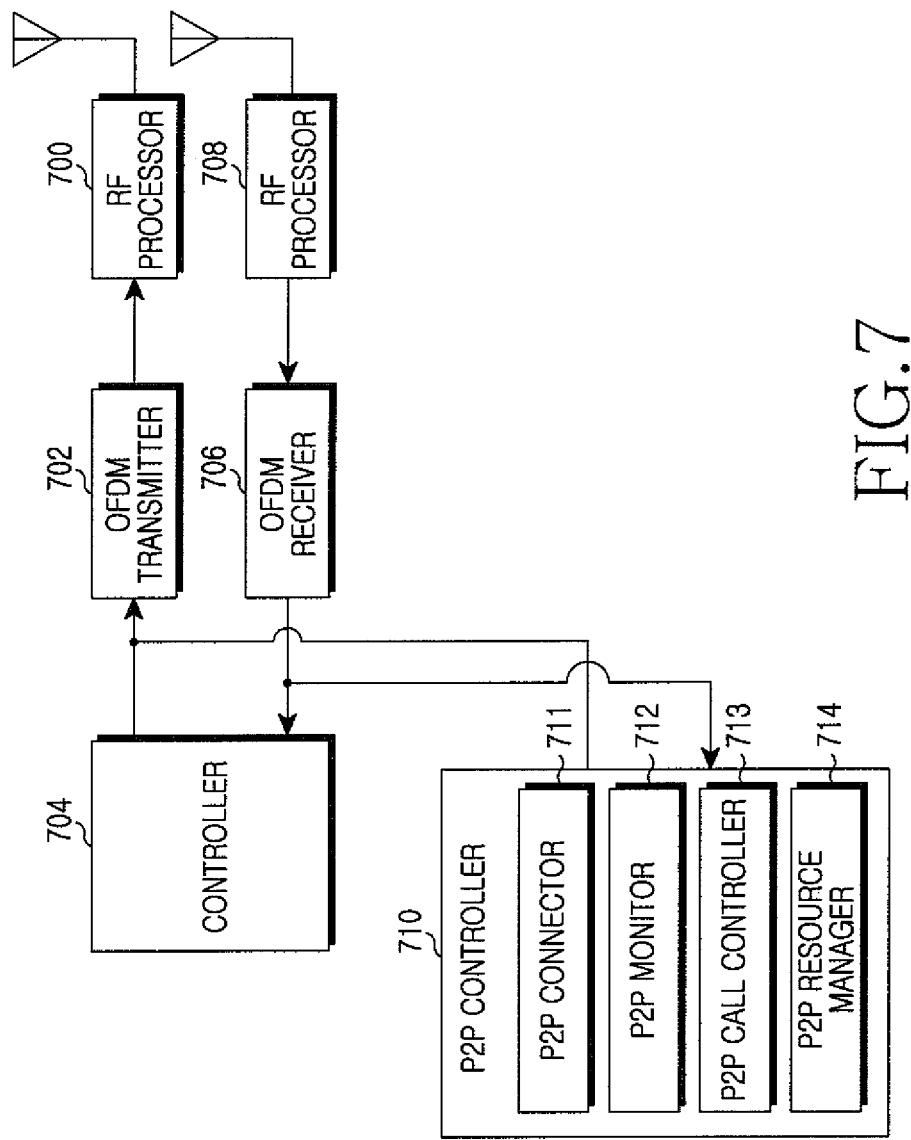
FIG. 7 is a block diagram of an MS for supporting connectivity of P2P communication between MSs in a mobile communication system according to an exemplary embodiment of the present invention.

FIG. 7 is a block diagram of an MS for supporting connectivity of P2P communication between MSs in a mobile communication system according to an exemplary embodiment of the present invention.

The MS of FIG. 7 includes an RF processor 700 for transmission, an OFDM transmitter 702, a controller 704, an OFDM receiver 706, an RF processor 708 for reception, and a P2P controller 710. The P2P controller 710 includes a P2P connector 711, a P2P monitor 712, a P2P call controller 713, and a P2P resource manager 714. The P2P controller 710 controls the P2P relay communications between the MSs. Herein, since the RF processor 700, the OFDM transmitter 702, the controller 704, the OFDM receiver 706, and the RF processor 708 are substantially the same as those in FIG. 6, they are not further discussed for brevity.

The P2P controller 710 receives necessary information from the relevant component of the physical layer during the P2P communication protocol processing, or issues a control signal to the relevant component of the physical layer.

More specifically, the P2P connector 711 locates the correspondent MS in the P2P communication mode and makes the P2P connection to the correspondent MS according to a preset procedure. When the correspondent MS of the P2P communication moves or the bad channel state complicates the direct P2P communications, the P2P connector 711 connects using the P2P relay via the BS by transmitting the P2P_Connection_RSQ message or receiving the P2P_Connection_RSP message.

The P2P monitor 712 determines whether the P2P service can last in the P2P communication by monitoring the corresponding MS by time periods or on a schedule. Alternatively, the P2P monitor 712 can be determine the P2P communicability based on information received from the BS.

The P2P call controller 713 controls the incoming P2P call processing or the outgoing P2P call processing. When the direct P2P communication is difficult to realize after the P2P monitor 712 determines the P2P communicability, the P2P call controller 713 communicates with the BS to make the P2P communication via the BS. For example, when MSs in the same service coverage area cannot make the direct P2P communication, the P2P call controller 713 attempts the P2P connection using the BS through the P2P connector 711. When the P2P communication is not serviced between different cells, the P2P call controller 713 performs the P2P handover with the corresponding BS.

The P2P resource manager 714 manages resources for the P2P communications and allocates the resources for the P2P communications if necessary.

It has been explained that the controllers 604 and 704 are the general mobile communication protocol controllers, and that the P2P controllers 610 and 710 are the P2P communication protocol controllers. Yet, the controllers 604 and 704 can function as both of the mobile communication protocol controller and the P2P communication protocol controller, or process merely part of the functions of the P2P controllers 610 and 710.

As set forth above, in the P2P communications of the mobile communication system, when the movement of the MS and/or the channel state makes it difficult to sustain the P2P service, the connectivity of the P2P communications between the MSs can be provided by means of the BS relay.

While the invention has been shown and described with reference to certain exemplary embodiments thereof, it will be understood by those skilled in the art that various changes in form and details may be made therein without departing from the spirit and scope of the invention as defined by the appended claims and their equivalents.

What is claimed is:

1. An operating method of a Mobile Station (MS) for providing connectivity of Peer-to-Peer (P2P) communications in a mobile communication system, the method comprising:

establishing, by the MS, a direct P2P communication with a correspondent MS in a service coverage area of a first Base Station (BS);

maintaining, by the MS, the established direct P2P communication with the correspondent MS without an intervention of the first BS;

determining, by the MS, whether the established direct P2P communication is no longer feasible with the correspondent MS during the established direct P2P communication;

when the direct P2P communication is no longer feasible, transmitting, by the MS, a P2P connection request message for requesting a relay of the established direct P2P communication, directly to the first BS;

receiving, by the MS, a P2P connection response message in response to the P2P connection request message, directly from the first BS; and maintaining, by the MS, a P2P data communication of the established direct P2P communication with the correspondent MS via the first BS based on the receipt of the P2P connection response message, wherein the P2P connection request message comprises at least one of a P2P network identifier, P2P resource information, or a P2P service type.

2. The operating method of claim 1, wherein the determining of whether the established direct P2P communication is feasible comprises:

determining that the established direct P2P communication is not feasible when a signal strength of the correspondent MS is lower than a threshold; and determining that the established direct P2P communication is feasible when the signal strength is equal to or greater than the threshold.

3. The operating method of claim 1, wherein the determining of whether the established direct P2P communication is feasible comprises:

determining that the established direct P2P communication is not feasible when a bandwidth required for the P2P communication with the correspondent MS is less than a bandwidth threshold; and determining that the established direct P2P communication is feasible when the required bandwidth is equal to or greater than the bandwidth threshold.

4. The operating method of claim 1, further comprising:

scanning for neighboring BSs when the MS moves from the service coverage area of the first BS;

handing over to a neighbor BS discovered through the scanning;

transmitting a P2P connection request message, to the neighbor BS;

receiving a P2P connection response message in response to the P2P connection request message; and maintaining the established direct P2P communication with the correspondent MS through the neighbor BS based on the receipt of the P2P connection response message.

5. The operating method of claim 1, further comprising:

monitoring the established relay P2P communication to determine if the direct P2P communication is feasible; and performing the established direct P2P communication between the MSs during the P2P relay communication when the direct P2P communication between the MSs is feasible.

6. The operating method of claim 5, wherein the monitoring comprises at least one of monitoring a signal strength of the correspondent MS, monitoring channel conditions and monitoring a delay time of a signal from the correspondent MS.

7. The operating method of claim 1, wherein the P2P connection request message includes at least one of a management message type, a P2P network ID, a P2P MS ID, P2P resource information, and a P2P service type, and wherein the P2P connection response message includes at least one of a management message type, a P2P connection approval or disapproval, an anchor BS ID, and a P2P service type.

8. An operating method of a Base Station (BS) for providing connectivity of Peer-to-Peer (P2P) communications in a mobile communication system, the method comprising:

receiving a P2P connection request message for maintaining a direct P2P communication, directly from at least one of a first Mobile Station (MS) and a second MS which make the direct P2P communication in the same cell;

transmitting a P2P connection response message in response to the P2P connection request message directly to the at least one of the first MS and the second MS; and when the direct P2P communication is no longer feasible, relaying a data communication of the P2P communication of the at least one of the first MS and the second MS via the BS, wherein the P2P connection request message comprises at least one of a P2P network identifier, P2P resource information, or a P2P service type.

9. The operating method of claim 8, further comprising:

handing over the first MS or the second MS to a neighbor BS when the first MS or the second MS moves to the neighbor BS during the P2P communication relay between the first MS and the second MS.

10. A Mobile Station (MS) apparatus for providing connectivity of P2P communications in a mobile communication system, the apparatus comprising:

a Peer-to-Peer (P2P) connector configured:
to establish a direct P2P communication with a correspondent MS in a service coverage area of a first Base Station (BS), and
to maintain, by the MS, the established direct P2P communication with the correspondent MS without an intervention of the first BS;

a P2P monitor configured to determine whether the established direct P2P communication is no longer feasible with the correspondent MS during the established direct P2P communication; and a P2P handover manager configured:
to transmit, by the MS, when the established direct P2P communication is no longer feasible, a P2P connection request message for requesting a relay of the established direct P2P communication, directly to the first BS,
to receive, by the MS, a P2P connection response message in response to the P2P connection request message directly from the first BS, and
to maintain, by the MS, a P2P data communication of the established direct P2P communication with the correspondent MS via the first BS based on the receipt of the P2P connection response message, wherein the direct P2P connection request message comprises at least one of a P2P network identifier, P2P resource information, or a P2P service type.

11. The apparatus of claim 10, wherein the P2P monitor determines that the established direct P2P communication is not feasible when a signal strength of the correspondent MS is lower than a threshold of the correspondent MS, and determines that the established direct P2P communication is feasible when the signal strength is equal to or greater than the threshold.

12. The apparatus of claim 10, wherein the P2P monitor determines that the established direct P2P communication is not feasible when a bandwidth required for the P2P communication with the correspondent MS is less than a bandwidth threshold, and determines that the established direct P2P communication is feasible when the required bandwidth is equal to or greater than the bandwidth threshold.

13. The apparatus of claim 10, wherein the P2P handover manager scans a neighbor BS when the MS moves from the first BS to the neighbor BS, hands over to a neighbor BS discovered through the scanning, transmits a P2P connection request message to the neighbor BS, receives a P2P connection response message in response to the P2P connection request message, and maintains the established direct P2P communication with the correspondent MS through the neighbor BS based on the receipt of the P2P connection response message.

14. The apparatus of claim 10, wherein the P2P connector performs the established direct P2P communication between MSs during a P2P relay using the first BS when the established direct P2P communication between the MSs is feasible by monitoring the P2P communication.

15. The apparatus of claim 14, wherein the monitoring of the P2P communication comprises at least one of monitoring a signal strength of the correspondent MS, monitoring channel conditions and monitoring a delay time of a signal from the correspondent MS.

16. The apparatus of claim 10, wherein the P2P connection request message includes at least one of a management message type, a P2P network ID, a P2P MS ID, P2P resource information, and a P2P service type, and wherein the P2P connection response message includes at least one of a management message type, a P2P connection approval or disapproval, an anchor BS ID, and a P2P service type.

17. A Base Station (BS) apparatus for providing connectivity of P2P communications in a mobile communication system, the apparatus comprising:

a Peer-to-Peer (P2P) connector configured:

to receive a connection request message for requesting a relay of a direct P2P communication directly from a first Mobile Station (MS) or a second MS which make the direct P2P communication in the same service coverage area, and to transmit a P2P connection response message in response to the P2P connection request message directly to the first MS or the second MS; and a P2P call controller configured to, when it is determined that the direct P2P communication is no longer feasible, relay a data communication of the P2P communication of the first MS or the second MS via the BS, wherein the direct P2P connection request message comprises at least one of a P2P network identifier, P2P resource information, or a P2P service type.

18. The apparatus of claim 17, wherein the P2P call controller hands the first MS or the second MS over to a neighbor BS when the respective first MS or second MS moves to the neighbor BS during the P2P communication relay between the first MS and the second MS.

19. The apparatus of claim 17, further comprising a P2P monitor configured to determine whether P2P service can be sustained by monitoring the first MS and the second MS.

20. The apparatus of claim 19, wherein the P2P monitor monitors at least one of monitoring by certain time periods, monitoring on a schedule and monitoring by receiving a report of P2P communicability from at least one of the first MS and the second MS.

* * * * *